No. 799,194. PATENTED SEPT. 12, 1905.
W. A. SCHENCK.
PIPE CUTTER, &c.
APPLICATION FILED SEPT. 2, 1903.
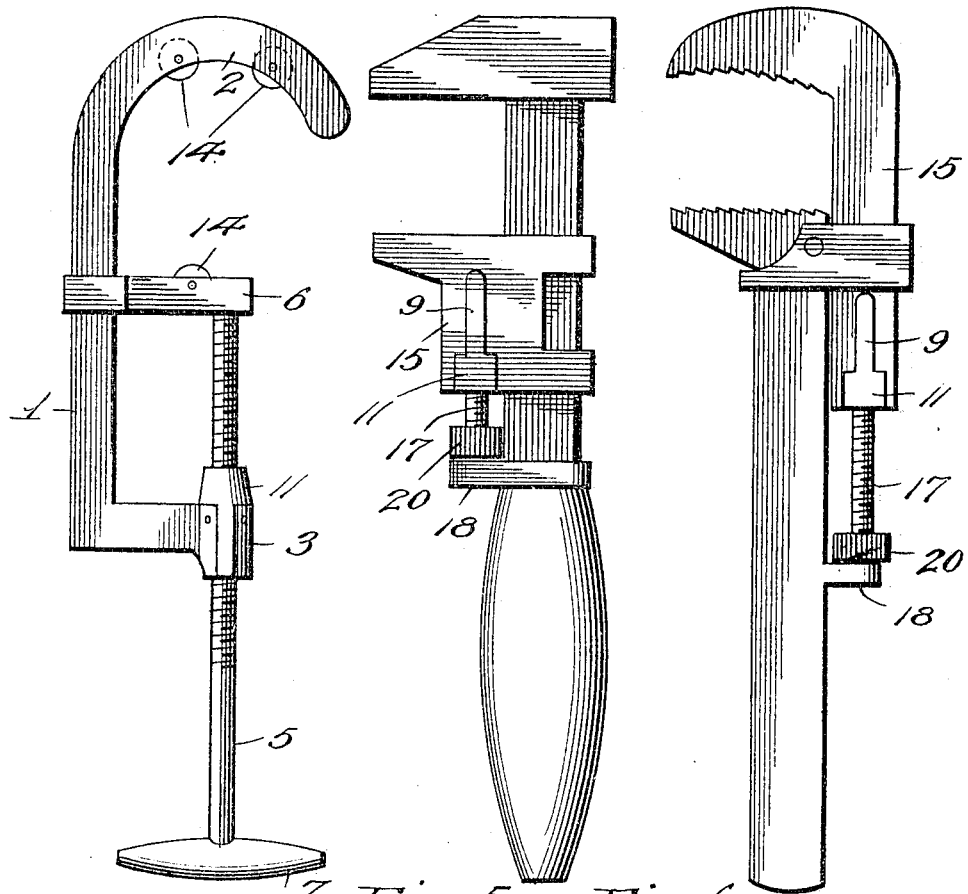
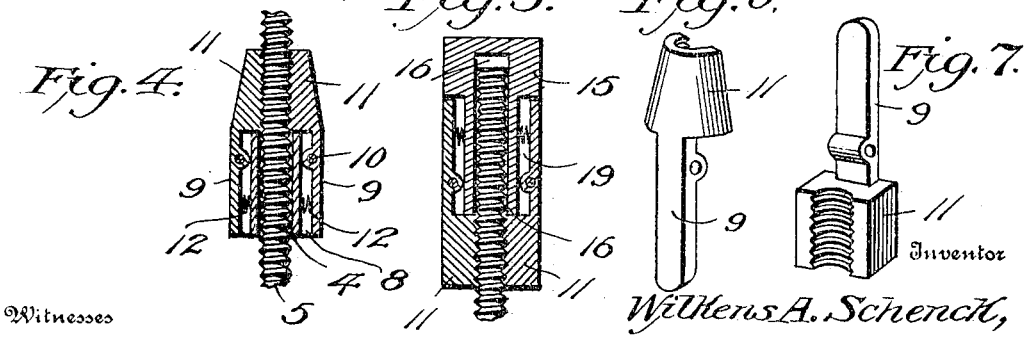
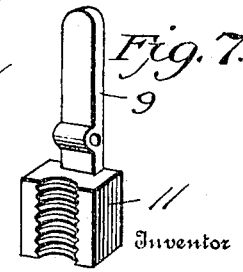
Witnesses
Geo. Ackman Jr.
John F. Byrne.
Inventor
Wittens A. Schenck,
By Victor J. Evans
Attorney

UNITED STATES PATENT OFFICE.

WILKENS A. SCHENCK, OF PHILADELPHIA, PENNSYLVANIA.

PIPE-CUTTER, &c.

No. 799,194.  Specification of Letters Patent.  Patented Sept. 12, 1905.

Application filed September 2, 1903. Serial No. 171,676.

*To all whom it may concern:*

Be it known that I, WILKENS A. SCHENCK, a citizen of the United States, residing at Philadelphia, in the county of Philadelphia and State of Pennsylvania, have invented new and useful Improvements in Pipe-Cutters, &c., of which the following is a specification.

My invention has relation to improvements in pipe-cutters, wrenches, and like tools having fixed and adjustable jaws; and its object is to provide new and improved means for imparting to the movable jaws thereof a quick primary adjustment to approximately adjust the jaws and a secondary and more accurate adjustment to properly adjust the jaws.

With this and other objects in view the invention consists of the features of construction, combination, and arrangement of parts hereinafter fully described and claimed, reference being had to the accompanying drawings, in which—

Figure 1 is a side elevation of a pipe-cutter constructed in accordance with my invention. Fig. 2 is a similar view of a nut-wrench. Fig. 3 is a similar view of a pipe-wrench. Fig. 4 is a longitudinal sectional view through the head of the pipe-cutter. Fig. 5 is a similar view of the sliding jaw of the nut-wrench. Fig. 6 is a detail perspective view of one member of the split nut used in connection with the pipe-cutter. Fig. 7 is a similar view of one member of the split nut used in connection with the nut or pipe wrench.

Referring to the drawings by numerals of reference, 1 designates the shank of a pipe-cutter, the forward end thereof being curved to provide a rigid jaw 2, while its rear or opposite end is disposed at right angles with relation to the shank 1. The upper end of the right-angularly-disposed portion of the shank 1 terminates in an enlarged head 3, which is provided with a longitudinally-arranged slot 4, adapted to receive an adjusting-rod 5 to permit of its having imparted thereto a reciprocatory and rotary motion. The forward end of the adjusting-rod 5 is swiveled in the upper end of a movable jaw 6, which is mounted upon the shank 1 to have a reciprocatory motion to cause it to approach and recede from the jaw 2, while the opposite end of said rod is provided with a handle 7, by means of which it may be manipulated. The head 3 is provided with longitudinally-arranged recesses 8, which are adapted to receive levers 9, said levers being pivotally secured within said slots through the medium of pintles 10, which are adapted to pass through perforated lugs arranged on the inner side of the levers. Secured to the forward end of each lever 9 is one member of a split nut 11 to dispose the same in advance of the head 3 and the bore thereof in longitudinal alinement with the slot 4 in order that said nut may normally engage a threaded portion of the adjusting-rod 5. The members of the nut are adapted to be retained in engagement with the threaded portion of the adjusting-rod 5 through the medium of springs 12, which are interposed between the levers and the inner walls of the recesses 8. The adjacent faces of the jaws 2 and 6 are provided with rotary cutting-disks 14.

The operation of the pipe-cutter may be described in the following manner: The members of the nut 11 are caused to be disengaged from the threaded portion of the rod 5 by a slight inward pressure upon the rear ends of the levers 9, thereby permitting the adjusting-rod 5 to be freely reciprocated, consequently causing the jaw 6 to either approach or recede from the jaw 2. The reciprocatory motion of the adjusting-rod 5 permits of the jaw 6 having imparted thereto the primary adjustment which facilitates the application and removal of the cutter to and from a pipe. The secondary adjustment of the jaw 6 may be accomplished to secure a more accurate adjustment of the jaw and to compensate for the cutting by the disks 14, by permitting the members of the nut 11 being forced into engagement with the threaded portion of the adjusting-rod, thereby permitting of only a rotary motion being imparted to said rod, which allows of the secondary adjustment of the jaw 6.

In Figs. 2 and 3 of the drawings I have disclosed a manner of adapting the movable jaws of a nut and pipe wrench with means for permitting the said jaws having primary and secondary adjustment imparted thereto, and in these instances the movable jaws 15 are provided with longitudinal slots 16, adapted to receive the ends of adjusting-screws 17, the opposite ends of which are swiveled in brackets 18, carried by the shanks of the wrenches. The jaws 15 are provided with approximately T-shaped recesses 19, the heads of which communicate with the slots 16. Mounted in the recesses 19 are the levers 9, which have secured to their forward ends members of the nut 11, which lie in the heads of the recesses 19 to permit of the adjusting-screws 17 being engaged thereby. In order to permit of either of the jaws 15 having a primary adjustment imparted thereto, the nut 11 is disengaged from the adjusting-screw 17 in the manner hereinbefore pointed out, which leaves the jaw free to be moved back and forth upon the shank of the wrench. The jaw may have imparted thereto the secondary adjustment in the manner hereinbefore pointed out, and in order that the adjusting-screw 17 may freely revolve to transmit the secondary adjustment it is provided with a milled washer 20.

It is apparent from the above description, taken in connection with the accompanying drawings, that I provide a means which will permit of a primary and secondary adjustment being imparted to the movable jaw of either a pipe-cutter, a nut or pipe wrench, and the like, and, further, that the same is cheap of construction, efficient in operation, and durable.

Having thus described the invention, what is claimed as new is—

A pipe-cutter or similar tool having fixed and movable jaws, and adjusting mechanism for the movable jaw, said mechanism consisting of a head having a longitudinal bore and longitudinal side recesses, said recesses being separated from said bore by interposed walls, a screw adapted to slide in said bore and actuate the movable jaw, a split nut adapted to engage the threads of the screw, the nut-sections being adapted to close over and against one end of the wall of the bore and rest at their bases thereon so as to be supported thereby against the pressure of the screw, levers connected at one end to the bases of the nut-sections and occupying said recesses and pivoted within the same to the head, the side walls of the recesses forming guides for the levers, and springs arranged radially to the bore within the recesses and bearing at their inner ends on the walls between the bore and recesses and at their outer ends upon the levers to force said levers to the outer portions of the recesses to hold the nut-sections in engagement with the screw, whereby the levers normally lie within the plane of the head and may be pressed inwardly within the recesses to release the nut-sections from engagement with the screw, substantially as described.

In testimony whereof I affix my signature in presence of two witnesses.

WILKENS A. SCHENCK.

Witnesses:
F. C. SOUTHERLAND,
C. J. PYFUS.